US012363806B2

(12) United States Patent
Hu et al.

(10) Patent No.: US 12,363,806 B2
(45) Date of Patent: Jul. 15, 2025

(54) MICROWAVE OVEN WITH INTEGRATED LOWER SURFACE HEATING PLATE

(71) Applicant: WHIRLPOOL CORPORATION, Benton Harbor, MI (US)

(72) Inventors: Hanks Hu, Shenzhen (CN); Ping Wu, Shenzhen (CN); Ryan Li, Shenzhen (CN); Shirley Mao, Shenzhen (CN); Tingting Yu, Shenzhen (CN); Muhammad Khizar, St. Joseph, MI (US)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 978 days.

(21) Appl. No.: 17/320,375

(22) Filed: May 14, 2021

(65) Prior Publication Data

US 2021/0392724 A1 Dec. 16, 2021

Related U.S. Application Data

(60) Provisional application No. 63/039,116, filed on Jun. 15, 2020.

(51) Int. Cl.
*H05B 6/64* (2006.01)

(52) U.S. Cl.
CPC ......... *H05B 6/6482* (2013.01); *H05B 6/6402* (2013.01)

(58) Field of Classification Search
CPC ...... H05B 6/6482; H05B 6/6485; H05B 6/76; H05B 6/80; H05B 1/0263; H05B 6/6405; H05B 6/6411; H05B 6/6447; H05B 6/645; H05B 6/647; H05B 6/6476; H05B 6/782; A47J 37/0611; A47J 2037/0617; A47J 36/027; A47J 36/38
USPC .... 219/685, 681, 725, 757, 729, 400, 460.1, 219/680, 690, 710, 719, 738, 746, 754, 219/756, 762, 732, 739; 99/451, 331; 126/198
See application file for complete search history.

(56) References Cited

U.S. PATENT DOCUMENTS

| | | | | |
|---|---|---|---|---|
| 3,266,477 A * | 8/1966 | Stiles | C22C 9/00 | 134/2 |
| 3,737,624 A * | 6/1973 | Eilenberger | H05B 3/74 | 219/466.1 |
| 4,326,113 A | 4/1982 | Toyoda et al. | | |

(Continued)

FOREIGN PATENT DOCUMENTS

| | | |
|---|---|---|
| CN | 2542951 Y | 4/2003 |
| CN | 1270129 C | 8/2006 |
| CN | 110811301 A | 2/2020 |

*Primary Examiner* — Vy T Nguyen
(74) *Attorney, Agent, or Firm* — Price Heneveld LLP

(57) ABSTRACT

A microwave oven includes a housing defining an interior cavity, a magnetron positioned within the housing and outside of the interior cavity and a micro-wave antenna in electrical communication with the magnetron and positioned adjacent a lower surface of the interior cavity. The micro-wave oven further includes a heating plate that includes a glass-ceramic substrate defining at least a portion of the lower surface of the interior cavity. The heating plate further includes a resistive-heating coating applied on a portion of the glass-ceramic substrate and defining at least one open micro-wave transmissive path from the micro-wave antenna to the interior cavity.

16 Claims, 7 Drawing Sheets

(56) References Cited

U.S. PATENT DOCUMENTS

| | | | | |
|---|---|---|---|---|
| 5,155,318 | A | 10/1992 | Bowen | |
| 7,235,763 | B2 | 6/2007 | Christiaansen et al. | |
| 7,507,939 | B2 | 3/2009 | Baumann | |
| 8,173,942 | B2 | 5/2012 | Wiseman et al. | |
| 8,759,728 | B2 | 6/2014 | Tassan-Mangina et al. | |
| 9,900,935 | B2 | 2/2018 | Simonato et al. | |
| 2003/0121913 | A1* | 7/2003 | Hayami | H05B 6/6494 219/730 |
| 2005/0258171 | A1 | 11/2005 | Witt | |
| 2006/0289514 | A1* | 12/2006 | Baumann | H05B 6/6482 219/729 |
| 2006/0289526 | A1* | 12/2006 | Takizaki | H05B 6/707 219/746 |
| 2015/0230295 | A1 | 8/2015 | Morassut et al. | |
| 2016/0025350 | A1 | 1/2016 | Goble et al. | |
| 2019/0045590 | A1* | 2/2019 | Kunimoto | F24C 7/046 |
| 2022/0418050 | A1* | 12/2022 | Mellor | H05B 3/10 |

* cited by examiner

MICROWAVE OVEN WITH INTEGRATED LOWER SURFACE HEATING PLATE

CROSS REFERENCE TO RELATED APPLICATION

This application claims the benefit under 35 U.S.C. § 119(e) to U.S. Provisional Patent Application No. 63/039,116, filed Jun. 15, 2020, entitled "MICROWAVE OVEN WITH INTEGRATED LOWER SURFACE HEATING PLATE," which is incorporated herein by reference in its entirety.

BACKGROUND OF THE DISCLOSURE

The present disclosure generally relates to a microwave oven, and more specifically, to a microwave oven with a resistive-heating plate along a portion of a lower interior cavity surface.

Existing microwave ovens have incorporated an upper heating element (such as a quartz heating tube) with an adjacent reflective area for directing radiant heat from the heating element downward toward food items within cavity to provide a broil/grill or crisping cooking mode. It can be appreciated, however, that such a solution only radiates heat to one side (i.e., the upper side) of the food items, leaving the other side to be cooked only by the microwaves. Some other existing solutions have added additional heating elements below lower surface (which may be made of glass). To allow effective microwave penetration into cavity, however, such heating elements must be positioned to the rear of the cavity, which prevents the lower heating element from providing beneficial heating to the bottom portion of food articles.

SUMMARY OF THE DISCLOSURE

According to one aspect of the present disclosure, a microwave oven includes a housing defining an interior cavity, a magnetron positioned within the housing and outside of the interior cavity and a micro-wave antenna in electrical communication with the magnetron and positioned adjacent a lower surface of the interior cavity. The microwave oven further includes a heating plate that includes a glass-ceramic substrate defining at least a portion of the lower surface of the interior cavity. The heating plate further includes a resistive-heating coating applied on a portion of the glass-ceramic substrate and defining at least one open micro-wave transmissive path from the micro-wave antenna to the interior cavity.

According to another aspect of the present disclosure, a heating assembly for a microwave oven includes a magnetron, a micro-wave antenna in electrical communication with the magnetron, and a heating plate positioned adjacent the micro-wave antenna. The heating plate includes a glass-ceramic substrate defining at least a food supporting surface and a resistive-heating coating applied on a portion of the glass-ceramic substrate in at least one continuous, elongate trace pattern defining at least one uncoated area of the glass-ceramic substrate between adjacent portions of the trace pattern. The at least one uncoated area defines at least one open micro-wave transmissive path from the micro-wave antenna through the heating plate.

According to another aspect of the present disclosure, a heating assembly for a microwave oven includes a magnetron, a micro-wave antenna in electrical communication with the magnetron, and a heating plate positioned adjacent the micro-wave antenna. The heating plate includes a glass-ceramic substrate defining at least a food supporting surface and a resistive-heating coating applied over a continuously-coated area occupying at least about 80% of a surface area of the glass-ceramic substrate. The resistive-heating coating defines a continuous uncoated area adjacent the continuously-coated area that defines at least one open micro-wave transmissive path from the micro-wave antenna through the heating plate.

These and other features, advantages, and objects of the present disclosure will be further understood and appreciated by those skilled in the art by reference to the following specification, claims, and appended drawings.

Figure 1:
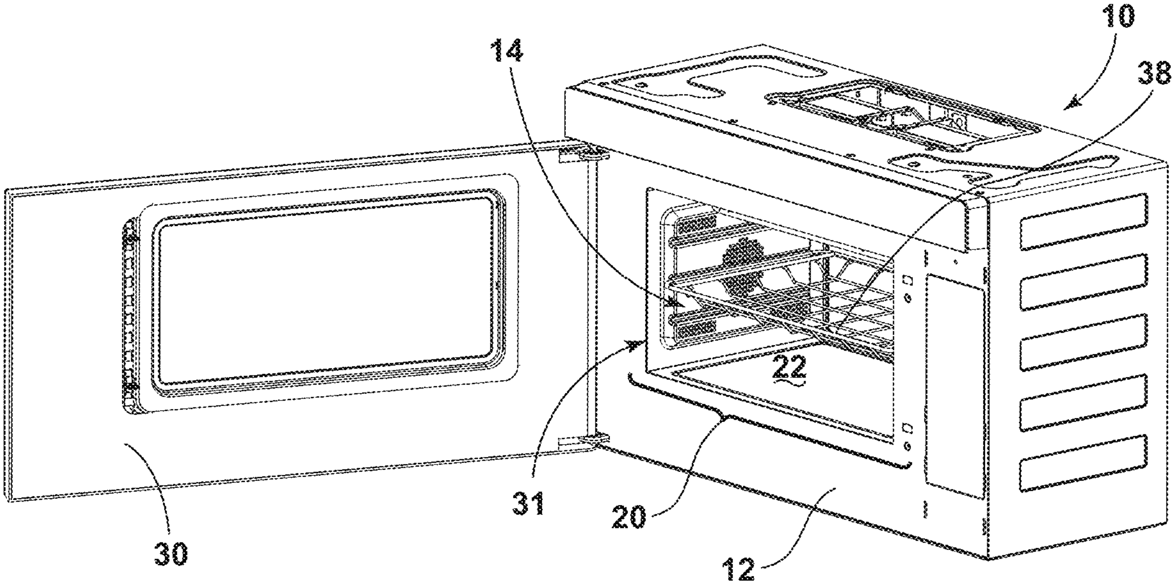
FIG. 1 is a top perspective view of a microwave oven according to the present disclosure with a door thereof in an open position.

The components in the figures are not necessarily to scale, emphasis instead being placed upon illustrating the principles described herein.

DETAILED DESCRIPTION

The present illustrated embodiments reside primarily in combinations of apparatus components related to a microwave oven. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-10C, reference numeral 10 generally designates a microwave oven that includes a housing 12 defining an interior cavity 14, a magnetron 16 positioned within the housing 12 and outside of the interior cavity 14 and a micro-wave antenna 18 in electrical communication with the magnetron 16 and positioned adjacent a lower surface 20 of the interior cavity 14. The microwave oven 10 further includes a heating plate 22 that includes a glass-ceramic substrate 24 defining at least a portion of the lower surface 20 of the interior cavity 14. The heating plate 22 further includes a resistive-heating coating 26 applied on a portion of the glass-ceramic substrate 24 and defining at least one open micro-wave transmissive path 28 from the micro-wave antenna 18 to the interior cavity 14.

Figure 2:
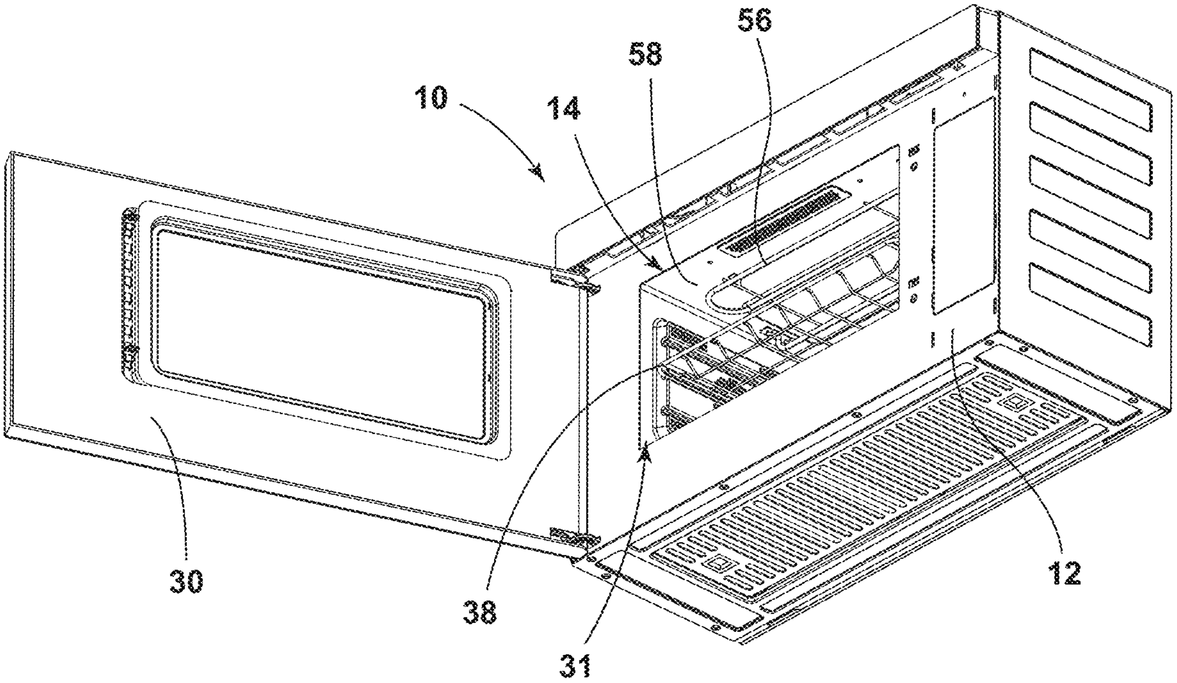
FIG. 2 is a bottom perspective view of the microwave oven of FIG. 1.
Figure 3:
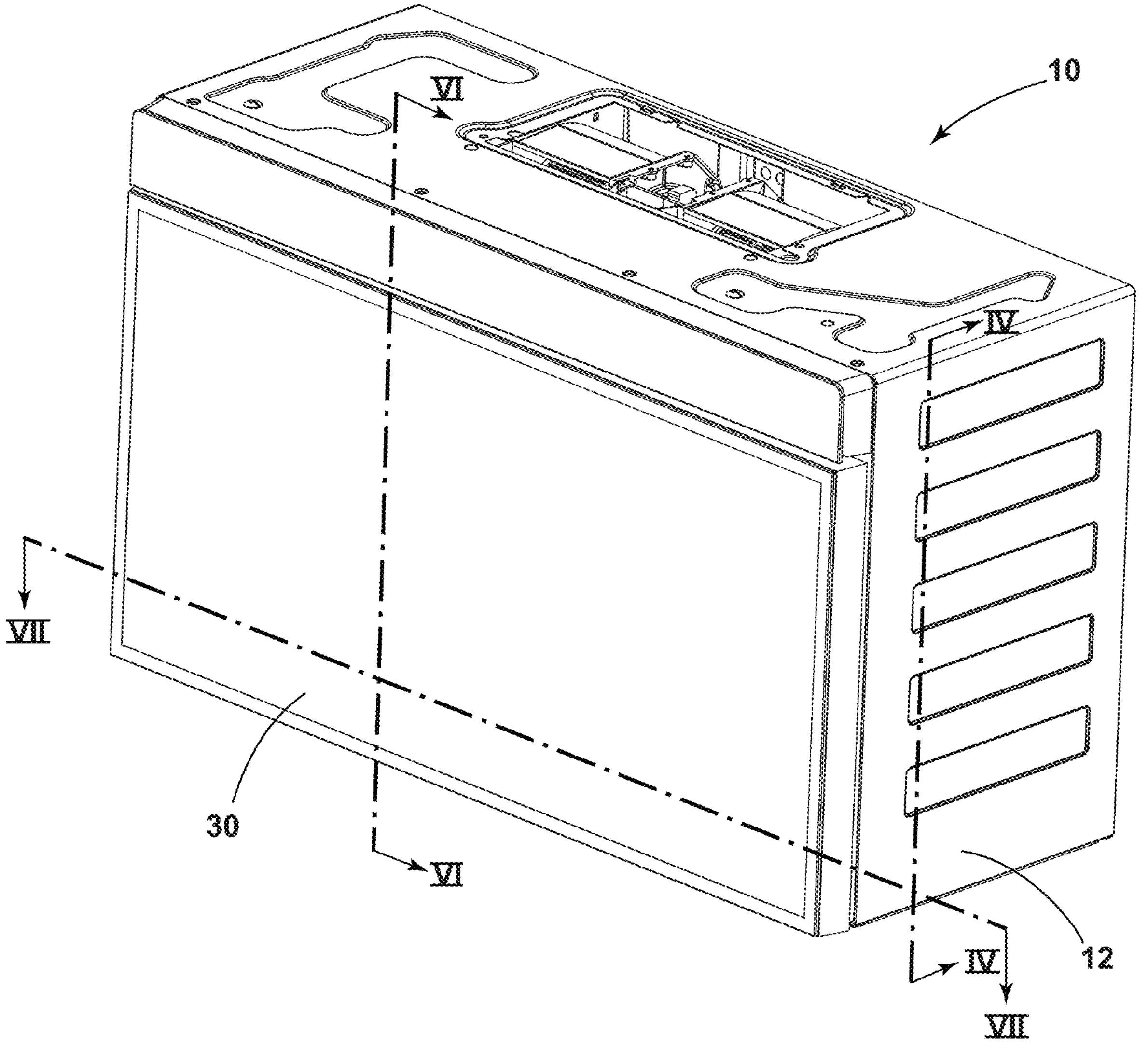
FIG. 3 is a top perspective view of the microwave oven of FIG. 1 with the door thereof in a closed position.

As generally shown in FIGS. 1 and 2, the microwave oven 10 includes a door 30 that opens (FIGS. 1 and 2) and closes (FIG. 3) over an open side of the interior cavity 14 to allow for the placement and removal of items to be heated into and from cavity 14. In this respect, the illustrated configuration of door 30 with respect to the housing 12 and the interior cavity 14 is merely illustrative, with it being understood that various door configurations are possible. Similarly, the configuration of the housing 12 and the portions of the interior cavity 14 not specifically discussed herein can vary according to the principles discussed herein and to accommodate the various features described in further detail herein. In this manner, it is also to be appreciated that the microwave oven 10 can also include various forms of controls for operation of the microwave oven 10, including the various heating functionality discussed herein. Such controls can be digital, electromechanical, or combinations thereof and can be included on one or both of the doors 30 and the housing 12.

Figure 4:
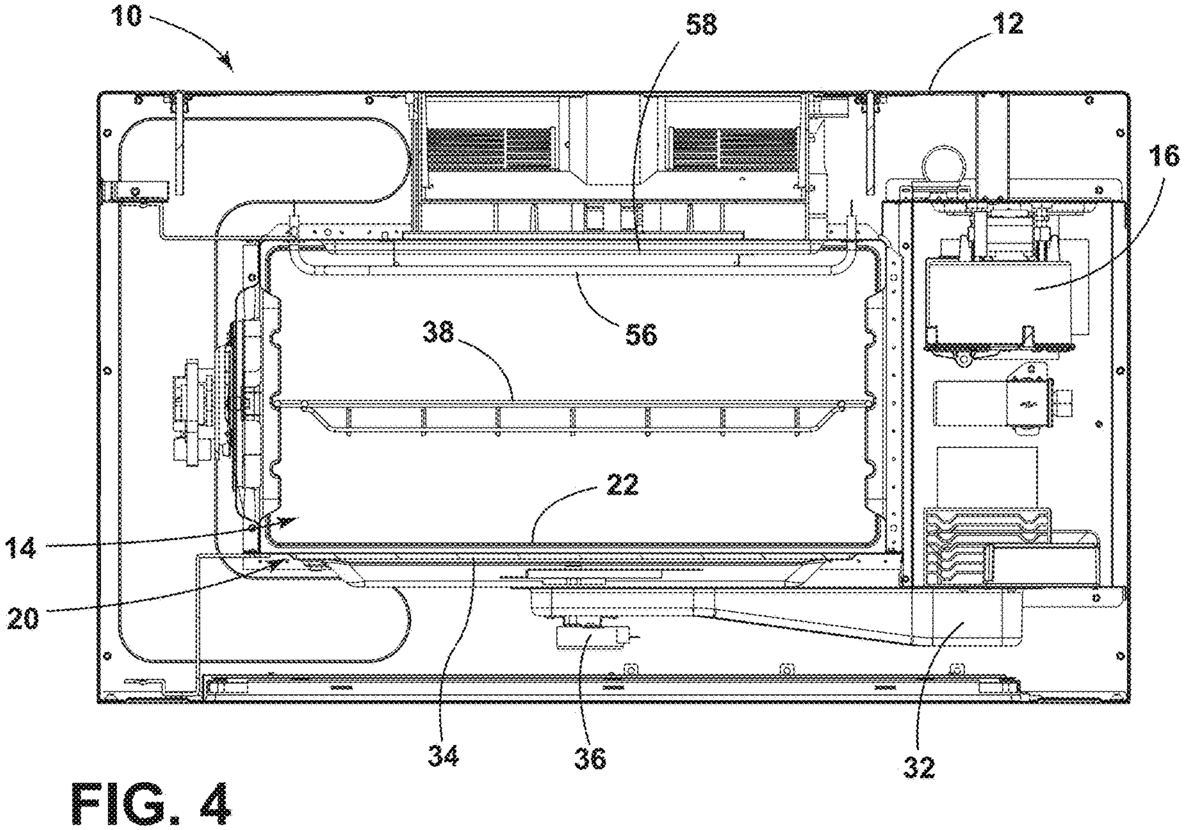
FIG. 4 is a front cross-section view of the microwave oven of FIG. 3, taken along the line IV-IV therein.
Figure 5:
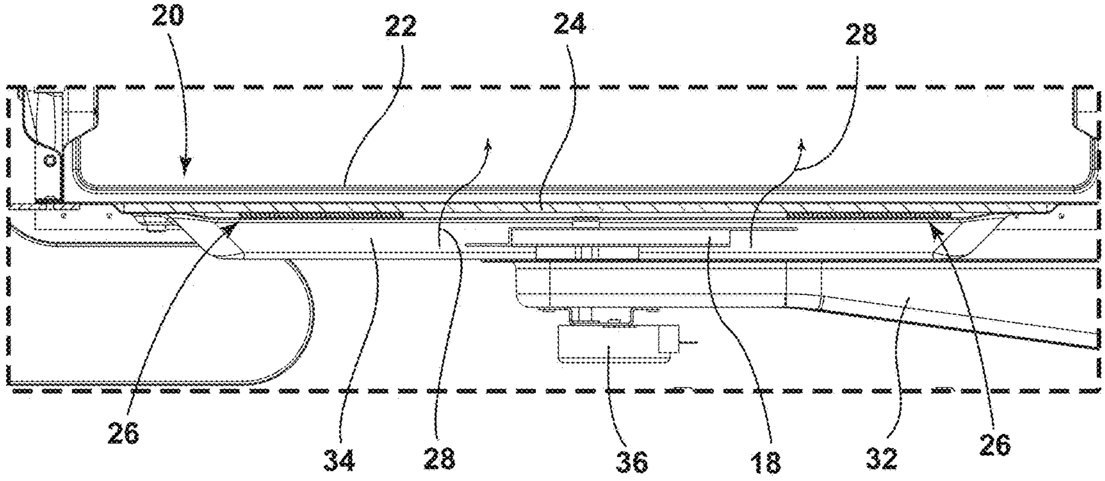
FIG. 5 is a detail view of a portion of the cross-section shown in FIG. 4.

As shown, in FIGS. 4 and 5, the microwave oven 10 is configured such that magnetron 16 delivers micro-waves into the interior cavity 14 to heat food products placed therein. In particular, the microwaves are directed through a microwave guide 32 toward a lower portion 34 of the microwave, more particularly within a void 36 between housing 12 and interior cavity 14 within the lower portion 34. The microwaves are then directed by antenna 18 through the lower surface 20 and into cavity 14. As further shown in FIGS. 6 and 7, the antenna 18 may be a directional structure rotatably supported within a lower sub-cavity 34 and coupled with a motor 36 to rotate antenna 18 within the sub-cavity 34 to generally evenly distribute the micro-waves through lower surface 20 and generally throughout cavity 14.

As is generally accepted, the use of micro-waves to heat food items, such as using the magnetron 16, guide 32, and antenna 18 configuration can provide for rapid, even heating of such food articles, but may be considered deficient for browning or surface-caramelization of such items. In the illustrated microwave, the heating plate 22 (FIG. 1) can employ resistive-heating to provide radiant heat and/or conductive heating to food items within microwave oven 10, as radiant and conductive heat can provide desired browning to supplement the micro-wave heating provided by the magnetron 16. In this respect, the heating plate 22 can be configured to provide such heating over a large portion of the lower surface 20 of cavity 14 (e.g., at least about 25% and in some configurations greater then about 60% of the area of lower surface 20) and/or along the areas of lower surface and/or in the area(s), particularly, along the central portion of the lower surface 20. In various configurations, heating plate 22 can provide conductive and radiant heat to the downward-facing portions of food items placed directly on heating plate 22 and can provide radiant heating to items positioned on a rack 38 suspended within cavity 14.

Figure 6:
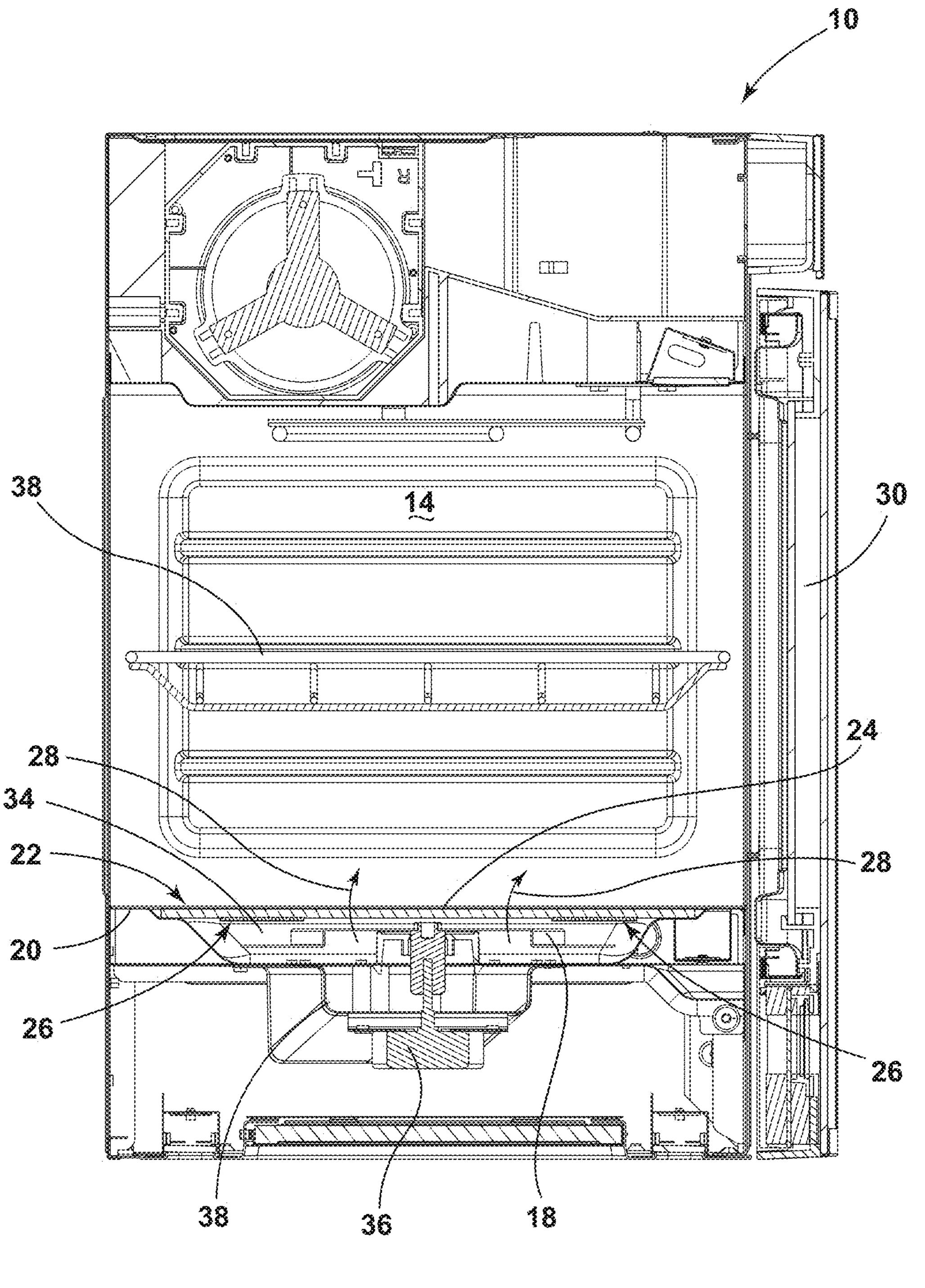
FIG. 6 is a side cross-section view of the microwave oven of FIG. 3, taken along the line VI-VI therein.
Figure 7:
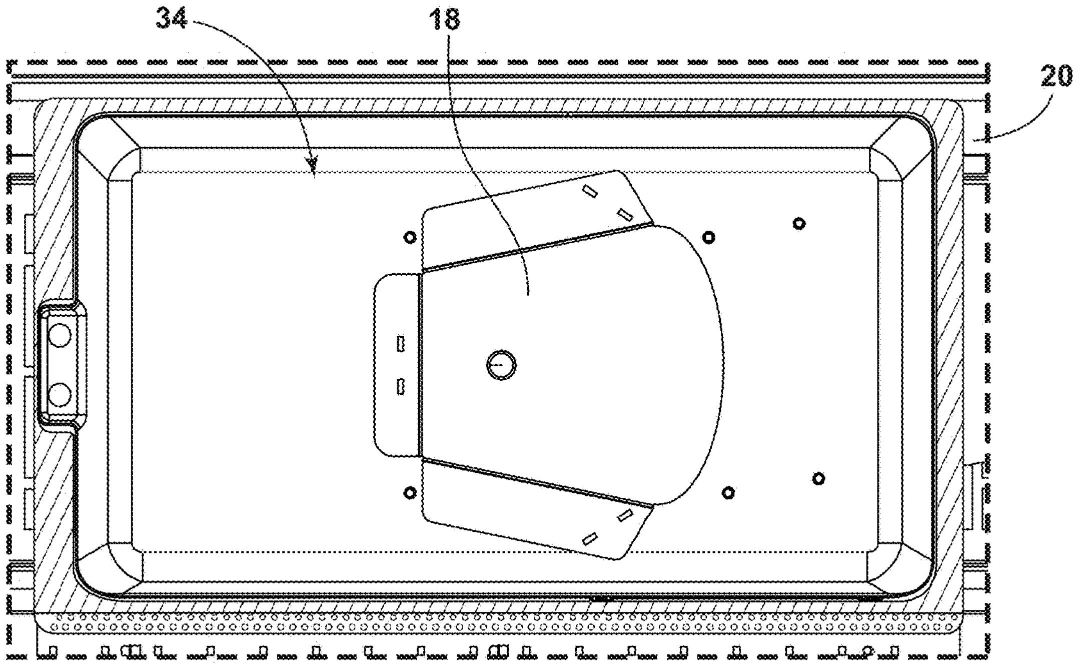
FIG. 7 is a top cross-section detail view of the microwave oven of FIG. 3, taken along the line VII-VII therein.

Due to the positioning of antenna 18 beneath heating plate 22, as shown in the cross-section views of microwave oven 10 shown in FIGS. 4-6, and the general configuration of microwave oven 10, in which the micro-waves generated by magnetron 16 are directed into interior cavity 14 through the lower surface 20 thereof, heating plate 22, in the various embodiments discussed herein, is configured to allow for acceptable transmission of the micro-waves directed toward interior cavity 14 through glass-ceramic substrate 24. As can be appreciated, glass-ceramic materials (and additional materials of a similar class, which may be substituted for the present "glass-ceramic" substrate 24 material) are generally permeable by micro-waves, while various materials that can be applied to the substrate 24 are generally impermeable by and/or act to absorb micro-waves. In this manner, depending on the particular material used for resistive-heating coating 26, and the particular configuration of the coating 26 suitable for the particular material (including according to the examples discussed below), the above-mentioned open microwave-transmissive path(s) 28 is/are provided to allow transmission of an acceptable amount of the micro-waves (e.g. about 50%) emitted via antenna 18 to pass through the resulting portions of the glass-ceramic substrate 24 that remain uncovered by the resistive-heating coating 26. Again, depending on the particular material used for the resistive-heating coating 26, as well as the structure and arrangement of antenna 18, for example, the proportion of the coating 26 to the open micro-wave transmissive path 28 portions may vary and may not directly correspond with the amount of micro-waves transmitted through glass-ceramic substrate 24.

Figure 8:
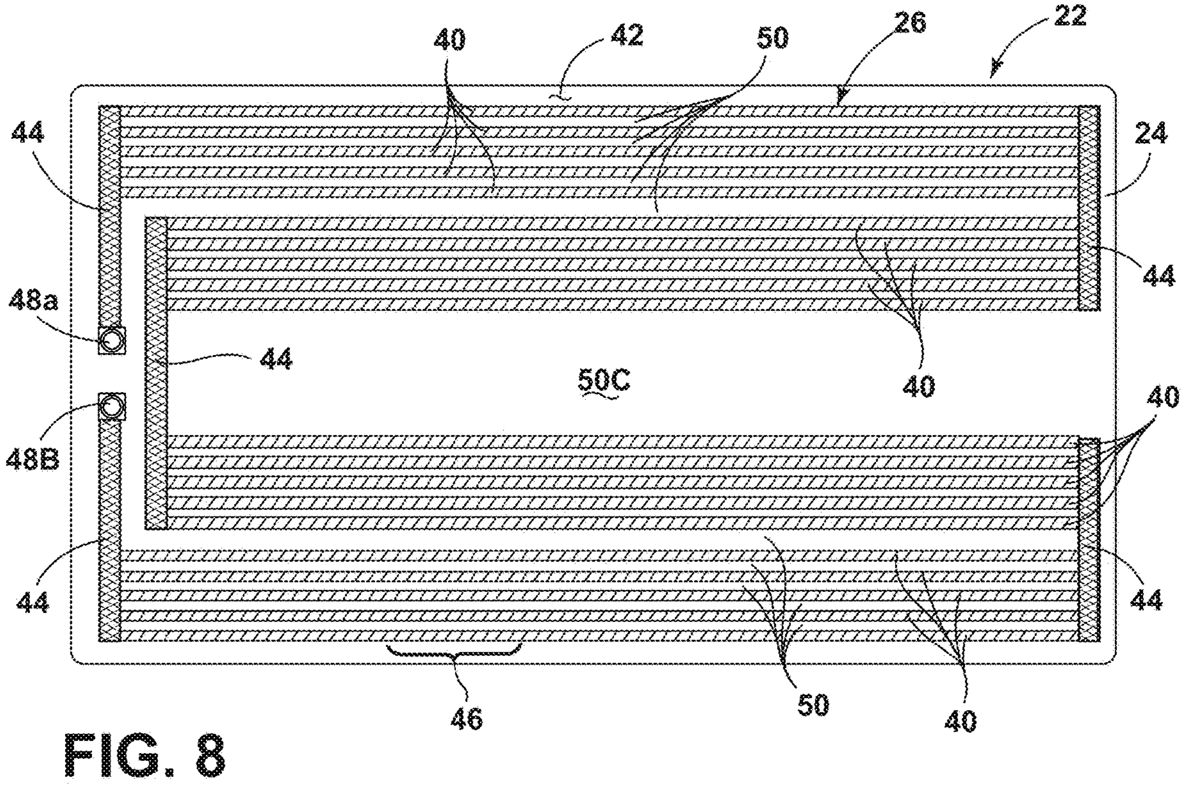
FIG. 8 is a top view of an example of a resistive-heating coating applied to the heating plate of the microwave oven.

In one embodiment, shown in FIG. 8, the heating plate 22 includes a glass-ceramic substrate 24 having a thickness sufficient for supporting food items thereon (e.g. between about 0.125 and 0.5 inches and in a further example between about 0.2 and 0.4 inches). In the illustrated embodiment, the resistive-heating coating 26 consists of a plurality of strips 40 of a material including palladium, such as palladium-oxide applied on the lower surface 42 of the glass-ceramic substrate 24. As illustrated, the strips 40 can be continuous or interconnected by a plurality of conductive busses 44 such that the strips 40 alone or combined with the busses 44 define a continuous trace pattern 46 along the lower (interior) surface of glass-ceramic substrate 24. In the illustrated example, the strips 40 can be arranged in various groups and connected together at adjacent ends thereof by corresponding busses 44. This can be done in various patterns to provide a generally even distribution of strips 40 along glass-ceramic substrate 24 for even generation of heat thereover. As further shown, the strips 40 and busses 44 can be spaced apart to provide a plurality of uncoated areas 50 between adjacent strips 40 and/or busses 44 to define one or more of the above-mentioned open micro-wave transmissive paths 28. This spacing and resulting uncoated areas 50 can provide a sufficient number, size, and arrangement of open micro-wave transmissive paths 28 for transmission of micro-waves through glass-ceramic substrate 24 to an acceptable amount and over an acceptable area for micro-wave heating of food items. In the illustrated example, one of such uncoated areas 50*c* can be centrally disposed along substrate 24 so as to generally align with the central portion of antenna 18 (such as vertically over motor 36 and/or the adjacent end of micro-wave guide 32 to provide a larger open micro-wave transmissive path 28 in an area with a higher concentration of emitted micro-waves.

The trace pattern 46, such as along particular, adjacent ones of busses 44, can include electrical terminals 48*a*,48*b* that can be used to selectively provide an electrical current to the resistive-heating coating 26 to cause heating of the strips 40, such heat being transferred through glass-ceramic substrate 24 by conduction and to any food items within cavity 14 by conduction and or radiation. The current can be provided to terminals 48*a*,48*b* by electronic circuitry within microwave oven 10, including the same circuitry connected to the power source of microwave oven 10 and further configured for providing the needed power to magnetron 16. In this manner, the electronic circuitry can control the amount of heat generated by heating plate 22 by, in various combinations, adjusting the voltage applied over terminals 48*a*,48*b*, adjusting the current provided to terminals 48*a*, 48*b*, and applying and removing specified voltage and current to terminals 48*a*,48*b* over varying time intervals.

Figure 9:
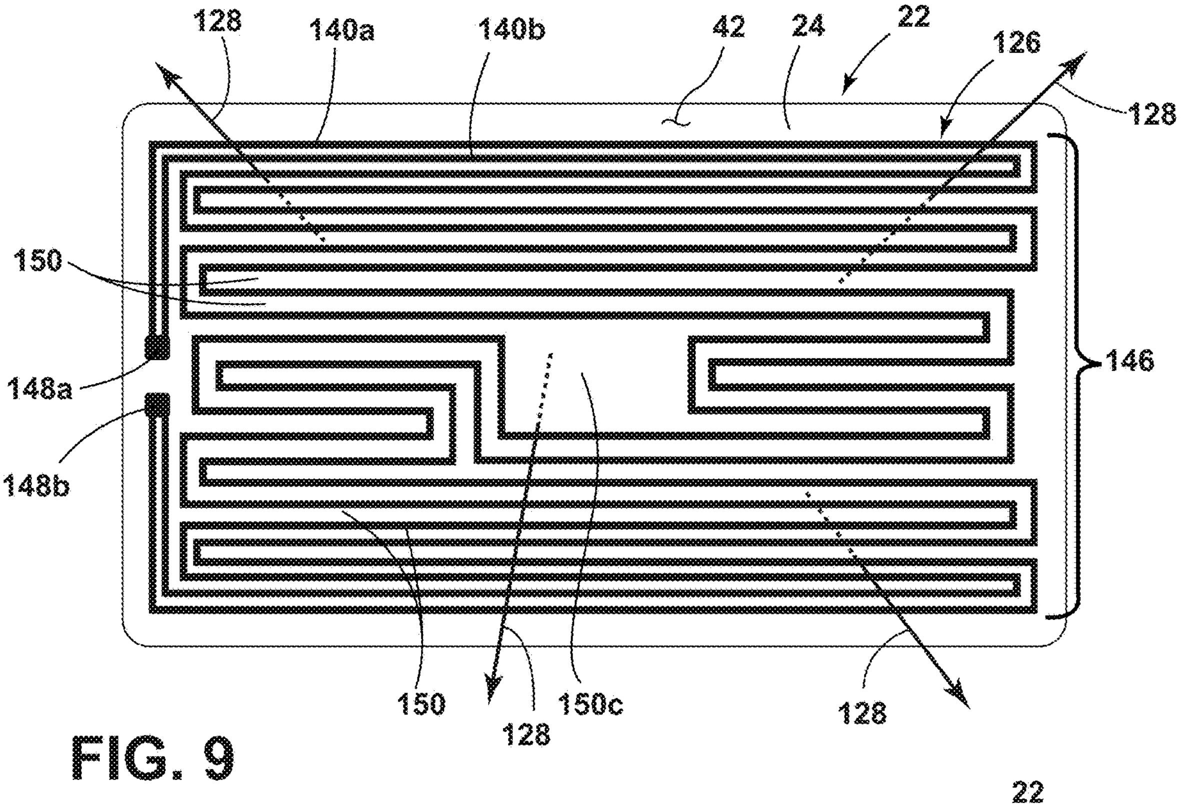
FIG. 9 is a top view of a further example of a resistive-heating coating applied to the heating plate of the microwave oven.

In another embodiment, illustrated in FIG. 9 (wherein like reference numerals increased by 100 indicate functionally similar elements to those discussed above with a variation in structure), the resistive-heating coating 126 can be of silver-oxide applied to lower surface 42 of glass-ceramic substrate 24. As shown, the resistive-heating coating 126 is similarly applied in a trace pattern 146. In the illustrated example, however, the trace pattern 146 is defined by two continuous strips 140*a*,140*b* that follow a generally similar path that circulates around the area of substrate 24 between terminals 148*a*,148*b*, with which both strips 140*a* and 140*b* are connected. As can be seen in the illustration, strips 140*a* and 140*b* are spaced from each other and adjacent areas of themselves to define uncoated areas 150 between adjacent portions of strips 140*a*,140*b* to define one or more open micro-wave transmissive paths 128. As discussed above, the spacing and resulting uncoated areas 150 can provide a sufficient number, size, and arrangement of open micro-wave transmissive paths 128 for transmission of micro-waves through glass-ceramic substrate 24 to an acceptable amount, and over an acceptable area, for micro-wave heating of food items. The present embodiment, in an example thereof similar to the example discussed above with respect to FIG. 8, one such uncoated area 150*c* can be centrally disposed along substrate 24 so as to generally align with the central portion of antenna 18 (such as vertically over motor 36 and/or the adjacent end of micro-wave guide 32, as shown in FIGS. 4-6) to provide a larger open micro-wave transmissive path 128 in an area with a higher concentration of emitted micro-waves.

Figure 10A:
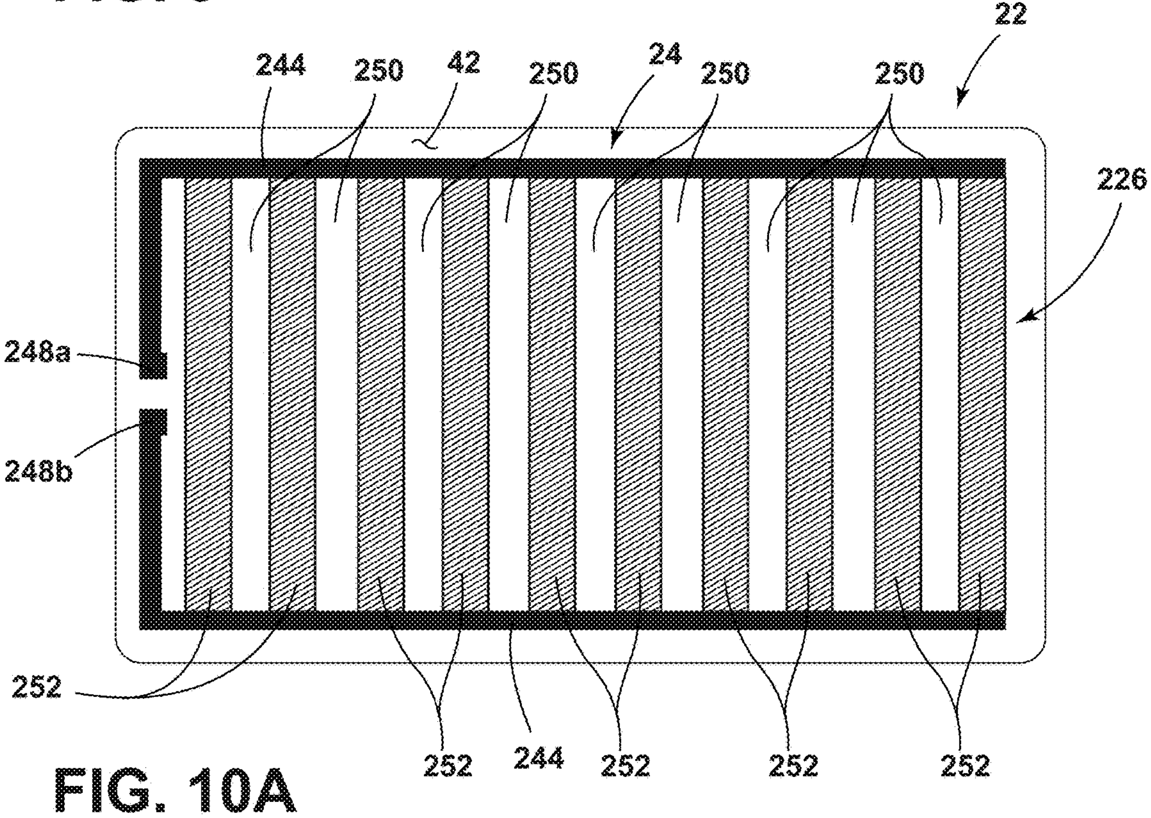
FIGS. 10A-10C are top views of variations of a further example of a resistive-heating coating applied to the heating plate of the microwave oven.
Figure 10B:
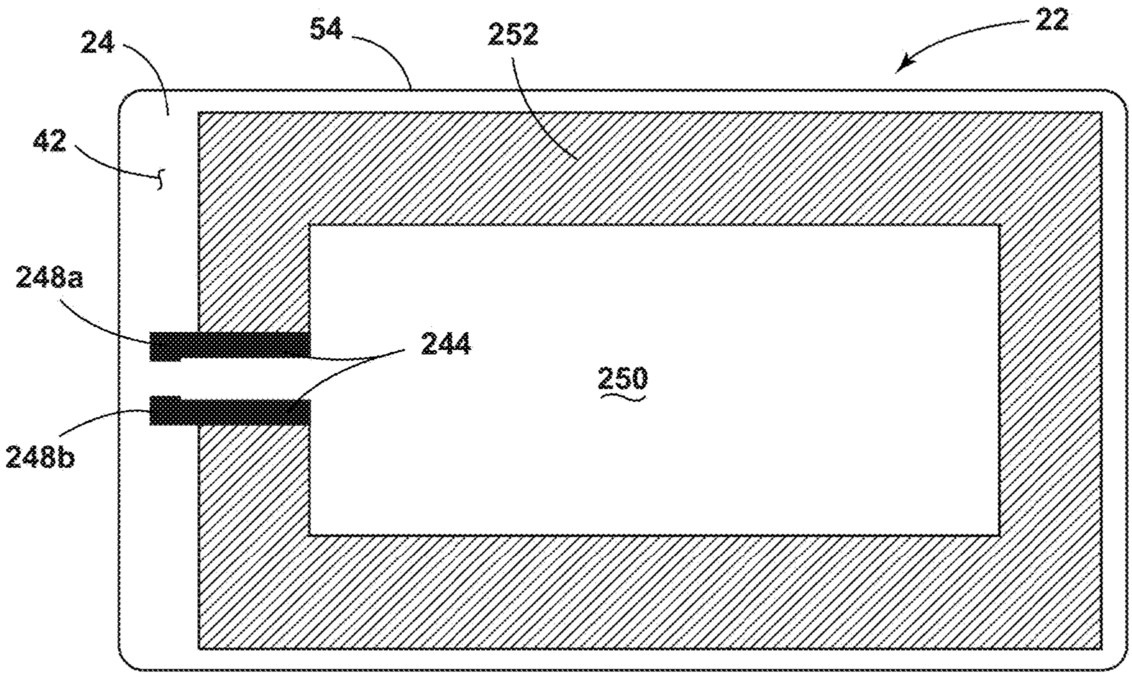
Figure 10C:
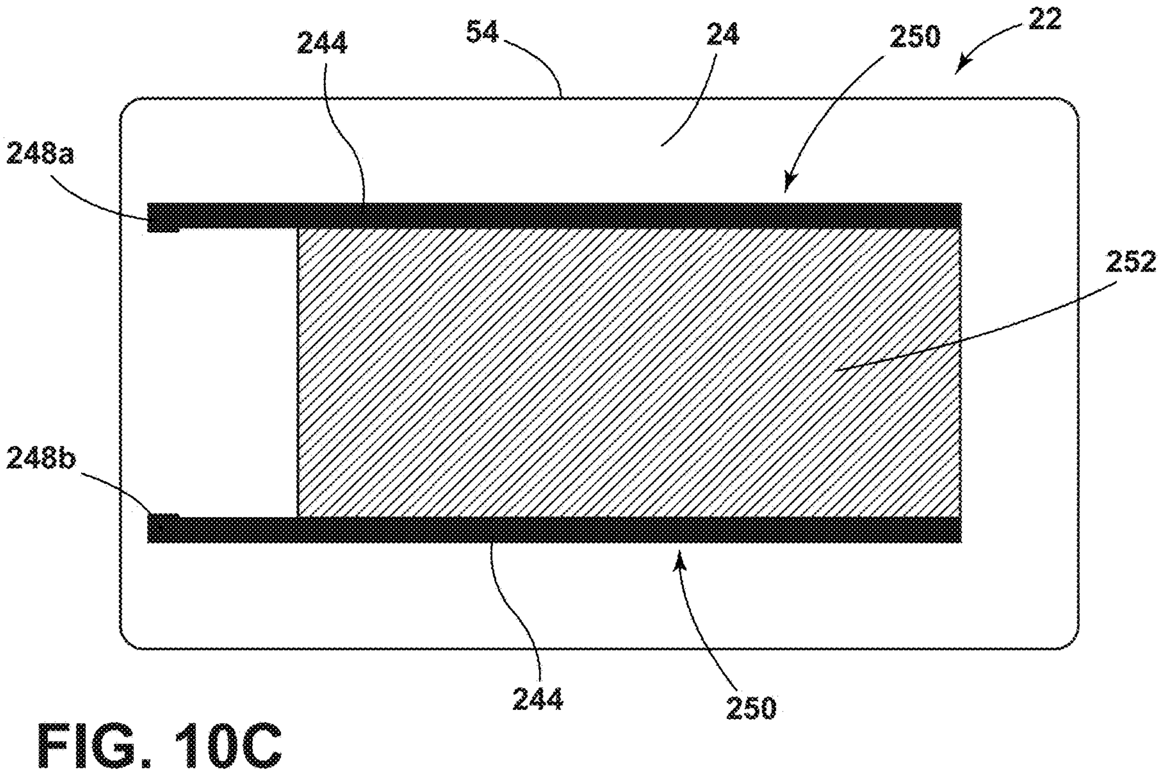

In another embodiment, examples of which are shown in FIGS. 10A-10C, the heating plate 22 can include a similar glass-ceramic substrate 24 with resistive-heating coating 226 comprising a layer graphite or tin-oxide ($SnO_2$) applied over a portion of lower surface 42 of substrate 24. Similar to the strips 40, 140*a*, and 140*b* of material in the trace patterns 46 and 146, discussed above, coating 226 can be energized by current applied to terminals 248*a* and 248*b*, which can be controlled to adjust the amount of heating realized by heating plate 22, as also discussed above. As illustrated, the nature of the materials used in the present coating 26 is such that they can be applied over relatively larger continuously coated areas 252 compared to the narrow material strips 40, 140*a*, and 140*b*, discussed above. In this manner, as shown in FIG. 10A, in one arrangement, a plurality of coated areas 252 can be applied in an alternating arrangement with uncoated areas 250. In the illustrated example the coated areas 252 and uncoated areas 250 can alternate laterally (i.e. across the substrate 24 in the direction of the open side 31 of cavity 14). Additionally, in the illustrated example, the coated areas 252 and uncoated areas 250 are approximately equal in width with each having a width of between about 10 mm and 25 mm, although other configurations are possible. As in other examples, it is to be appreciated here that the uncoated areas 250 can provide open micro-wave transmissive paths 28 by which micro-waves can pass into interior 14, the present materials being generally absorbent of micro-waves. The coated areas 252 are electrically connected with busses 244 that extend from respective terminals 248*a*,248*b* to provide electrical current to the coated areas 252 for generating heat, as discussed above.

In a further example shown in FIG. 10B, a single coated area 252 can be disposed generally around the outer periphery 54 with an uncoated area 250 disposed inward of the coated area 252. As shown, the coated area 252 can extend between two adjacent busses 244 that include terminals 248*a*,248*b*. The coated area 252 can be immediately adjacent the outer periphery 54 or can be spaced therefrom to account for outward radiation of the heat produced thereby and/or to accommodate terminals 248*a*,248*b*. Alternatively, the coated area 252 can be centrally disposed within lower surface 42. Additionally or alternatively, the glass-ceramic substrate 24 can define an outer periphery 54 with the uncoated area 250 extending around the outer periphery 54 of the glass-ceramic substrate 24 such that the continuously coated area 252 is spaced inward of the outer periphery 54 with the uncoated area 250 extending from the outer periphery 54 inward. As shown, busses 244 can extend along opposite sides of the coated area 252 and can extend outwardly over a portion of uncoated area 250 to provide for connection to the above-described circuitry. In the above examples, the coated area(s) 252 can occupy at least about 80% of a surface area of the glass-ceramic substrate 24. The uncoated area 250 of the resistive-heating coating 226 can be at least partially aligned with the micro-wave antenna 18. In particular, in the example of FIG. 10B, the uncoated area 250 can align at least with a central portion of the antenna 18. Alternatively, in the example of FIG. 10C, the uncoated area 250 can align with the outer portion of antenna 18, including by its rotation within sub-cavity 34 by motor 36.

In a microwave oven 10 including any of the above-described embodiments of the heating plate 22, the magnetron 16 and heating plate 22 are selectively operable (including by the above-described circuitry and under control of user by, for example, the selection of various options) to provide various combinations of microwave and conductive/radiant heating to food items received in the interior cavity 14. Additionally, as shown in FIGS. 2, 4, and 6, the micro-wave 10 oven can further include a radiant heating element 56 (that can include a calrod element, a quartz tube element, a metal tube element, or the like) heating mounted within the interior cavity 14 adjacent an upper surface 58 thereof. In this further configuration, the magnetron 16, heating plate 22, and radiant heating element 56 are selectively operable to provide various selectable combinations of microwave heating, downwardly-directed radiant heating, and upwardly-directed conductive/radiant heating to food items received in the interior cavity 14. Again, microwave oven 10 can be configured to provide various combinations of these types of heating according to various user-selectable options, including various cooking programs (e.g., food-type specific programs) or the like.

According to another aspect of the present disclosure, a microwave oven 10 includes a housing 12 defining an interior cavity 14, a magnetron 16 positioned within the housing 12 and outside of the interior cavity 14 and a micro-wave antenna in electrical communication with the magnetron 16 and positioned adjacent a lower surface of the interior cavity 14. The microwave oven 10 further includes a heating plate 22 that includes a glass-ceramic substrate 24 defining at least a portion of the lower surface of the interior cavity 14. The heating plate 22 further includes a resistive-heating coating applied on a portion of the glass-ceramic substrate 24 and defining at least one open micro-wave transmissive path 28 from the micro-wave antenna to the interior cavity 14. Various further aspects of the disclosure can include any one or a combination of the following features:

- the resistive-heating coating is of one of silver-oxide and palladium-oxide and is applied in at least one continuous, elongate trace pattern 46 defining at least one uncoated area of the glass-ceramic substrate 24 between adjacent portions of the trace pattern 46, the at least one uncoated area defining the at least one open micro-wave transmissive path 28;
- the resistive-heating coating is of one of Graphite or tin-oxide, and is applied over a continuously-coated area occupying at least about 80% of a surface area of the glass-ceramic substrate 24, and defines a continuous uncoated area within the continuously-coated area that defines the at least one open micro-wave transmissive path 28. The continuous uncoated area of the resistive-heating coating can be at least partially aligned with the micro-wave antenna. Additionally or alternatively, the glass-ceramic substrate 24 can define an outer periphery with the uncoated area extending around the outer periphery of the glass-ceramic substrate 24 such that the continuously coated area is spaced inward of the outer periphery;
- the heating plate 22 further includes a pair of electrodes applied over respective, spaced-apart portions of the resistive-heating coating; and
- the microwave oven 10 further includes a power source, and the power source is electrically connected with the resistive-heating coating to selectively provide an electrical current thereto;
- the magnetron 16 and heating plate 22 are selectively operable to provide various combinations of micro-wave, radiant, and conductive heating to food items received in the interior cavity 14; and
- the microwave oven 10 further includes a radiant heating element 56 mounted within the interior cavity 14 adjacent an upper surface 58 thereof, and the magnetron 16, heating plate 22, and radiant heating element 56 are selectively operable to provide various combinations of microwave heating, downwardly-directed radiant heating, and upwardly-directed radiant heating to food items received in the interior cavity 14.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term “coupled” (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, layouts, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A microwave oven, comprising:

a housing defining an interior cavity;

a magnetron positioned within the housing and outside of the interior cavity;

a micro-wave antenna in electrical communication with the magnetron and positioned adjacent a lower surface of the interior cavity; and a heating plate including a glass-ceramic substrate defining at least a portion of the lower surface of the interior cavity, the heating plate further including a resistive-heating coating applied on a portion of the glass-ceramic substrate and defining a plurality of open micro-wave transmissive paths from the micro-wave antenna to the interior cavity, wherein:

the resistive-heating coating is applied in at least one continuous, elongate trace pattern defining a plurality of uncoated areas of the glass-ceramic substrate between adjacent portions of the trace pattern, the plurality of uncoated areas defining the at least one open micro-wave transmissive path; and a centrally-disposed one of the uncoated areas has a depth that is larger than depths of the remaining uncoated areas.

2. The microwave oven of claim 1, wherein the resistive-heating coating is of one of silver-oxide and palladium-oxide.

3. The microwave oven of claim 1, wherein the magnetron and the heating plate are selectively operable to provide selectable combinations of at least one of microwave, radiant, and conductive heating to food items received in the interior cavity.

4. The microwave oven of claim 1, further including a radiant heating element mounted within the interior cavity adjacent an upper surface thereof, wherein:

the magnetron, the heating plate, and the radiant heating element are selectively operable to provide selectable combinations of at least one of microwave heating, downwardly-directed radiant heating, upwardly-directed radiant heating, and upwardly-directed conductive heating to food items received in the interior cavity.

5. The microwave oven of claim 1, wherein the magnetron and the heating plate are selectively operable to provide selectable combinations of at least one of microwave, radiant, and conductive heating to food items received in the interior cavity.

6. The microwave oven of claim 1, wherein the centrally disposed one of the uncoated areas is vertically aligned with the micro-wave antenna.

7. A microwave oven, comprising:

a housing defining an interior cavity;

a power supply positioned within the housing and outside of the interior cavity;

a magnetron positioned within the housing and outside of the interior cavity and operably connected with the power supply;

a micro-wave antenna in electrical communication with the magnetron and positioned adjacent a lower surface of the interior cavity; and a heating plate including a glass-ceramic substrate defining at least a portion of the lower surface of the interior cavity, the heating plate further including a resistive-heating coating applied on a portion of the glass-ceramic substrate and defining a plurality of open micro-wave transmissive paths from the micro-wave antenna to the interior cavity, the heating plate being electrically connected with the power supply to cause the resistive-heating coating to generate heat, wherein:

the resistive-heating coating is applied in at least one continuous, elongate trace pattern defining a plurality of uncoated areas of the glass-ceramic substrate between adjacent portions of the trace pattern, the plurality of uncoated areas defining the at least one open micro-wave transmissive path; and a centrally-disposed one of the uncoated areas has a depth that is larger than depths of the remaining uncoated areas.

8. The microwave oven of claim 7, wherein the resistive-heating coating comprises one of one of silver-oxide and palladium-oxide.

9. The microwave oven of claim 7, further including a radiant heating element mounted within the interior cavity adjacent an upper surface thereof and connected with the power supply, wherein:

the magnetron, the heating plate, and the radiant heating element are selectively operable to provide selectable combinations of at least one of microwave heating, downwardly-directed radiant heating, upwardly-directed radiant heating, and upwardly-directed conductive heating to food items received in the interior cavity.

10. The microwave oven of claim 7, wherein the centrally disposed one of the uncoated areas is vertically aligned with the micro-wave antenna.

11. A microwave oven, comprising:

a housing defining an interior cavity;

a magnetron positioned within the housing and outside of the interior cavity;

a micro-wave antenna in electrical communication with the magnetron and positioned adjacent a lower surface of the interior cavity; and a heating plate including a glass-ceramic substrate defining at least a portion of the lower surface of the interior cavity, the heating plate further including a resistive-heating coating applied on a portion of the glass-ceramic substrate as a plurality of bus bars extending along the depth of the heating plate and at least two corresponding groups of at least three strips spaced apart along respective ones of the plurality of bus bars to collectively extend along the depth of the heating plate, the strips extending across at least a portion of the width of the heating plate.

12. The microwave oven of claim 11, further including a power source, wherein at two of the bus bars are separately connected with the power supply at electronic terminals respectively coupled with at least two of the plurality of bus bars.

13. The microwave oven of claim 11, wherein the corresponding groups of at least three strips define at least one uncoated area of the glass-ceramic substrate between adjacent ones of the at least three strips, and between the corresponding groups of at least three strips, to define respective open micro-wave transmissive paths, a centrally disposed open path between ones of the corresponding groups of at least three strips having a depth that is larger than depths of the remaining uncoated areas.

14. The microwave oven of claim 13, wherein the resistive-heating coating is of one of silver-oxide and palladium-oxide.

15. The microwave oven of claim 13, wherein respective groups of at least three strips are disposed on opposite sides of the central open area and are connected together on the side of the open area by the elongate bus bar.

16. The microwave oven of claim 11, wherein an elongate bus bar extends along a side of the central open area.

* * * * *